United States Patent [19]

Schopper et al.

[11] 4,365,846
[45] Dec. 28, 1982

[54] DUAL-CIRCUIT PRESSURE CONTROL VALVE FOR HYDRAULIC BRAKE SYSTEMS

[75] Inventors: Bernd Schopper, Hattersheim; Peter Tandler, Falkenstein; Herbert Hartmann, Wiesbaden; Manfred Reuter, Weilmuenster, all of Fed. Rep. of Germany

[73] Assignee: ITT Industries, Inc., New York, N.Y.

[21] Appl. No.: 239,732

[22] Filed: Mar. 2, 1981

[30] Foreign Application Priority Data

Apr. 2, 1980 [DE] Fed. Rep. of Germany ....... 3012765

[51] Int. Cl.³ ............................................. B60T 17/00
[52] U.S. Cl. ....................................... 303/56; 251/235
[58] Field of Search ..................... 74/471 R, 478, 519, 74/522.5, 523; 251/217, 235, 242, 243; 303/22 R, 50, 52, 56

[56] References Cited

U.S. PATENT DOCUMENTS

| | | | |
|---|---|---|---|
| 1,032,470 | 7/1912 | Denneen et al. | 251/235 |
| 2,329,742 | 9/1943 | Bush et al. | 303/52 |
| 3,827,765 | 8/1974 | Husted | 303/52 |

Primary Examiner—Duane A. Reger
Attorney, Agent, or Firm—John T. O'Halloran; Alfred C. Hill

[57] ABSTRACT

Dual circuit brake force control units are known in which the initial preloading force is changeable dependent on the vehicle load. The preloading force is distributed to the control pistons by means of a lever. Due to the tolerances and erosion of the individual elements, considerable differences in pressure in both brake circuits may occur. Therefore, according to the present invention a lever is provided which directly acts on both control pistons and which is rotatable around an axis parallel to the direction of displacement of the control pistons and additionally around the longitudinal axis of the lever. The lever is in interaction with its housing mount at one support point at least and at two support points at the most with the support point or support points being located at least approximately in the longitudinal axis of the lever.

9 Claims, 10 Drawing Figures

DUAL-CIRCUIT PRESSURE CONTROL VALVE FOR HYDRAULIC BRAKE SYSTEMS

BACKGROUND OF THE INVENTION

The present invention relates to a dual-circuit pressure control valve for use in hydraulic brake systems for automotive vehicles comprising two control pistons which are arranged in a parallel side by side relationship each assigned to a different brake circuit and which are loaded by a common, adjustable preloading force, with the preloading force acting on the control pistons by means of a lever which is supported at a mounting at the housing of the pressure control valve and is tiltable at least around an axis extending parallel to the direction of displacement of the control pistons and additionally around the longitudinal axis of the lever.

In copending U.S. patent application Ser. No. 160,523, filed June 18, 1980, assigned to the same assignee as the present application, a dual-circuit pressure control valve with a change-over point adjustable from the outside is described, in which the lever is supported at the housing in a spherical joint and a compensating effect is, therefore, rendered possible in each direction. This pressure control valve is characterized by simple construction and ease of assembly and remedies tolerance and adjustment problems inherent in former arrangements.

Dependent on the composition of the surfaces of the two components movable in one another in the spherical joint, a specific friction moment may occur when tilting the lever, which moment is able to be eliminated by an appropriate surface treatment. Additionally, the sliding ability of the two surfaces may be impaired in the course of time by dirt or oxidation which also causes a certain friction moment during the tilting of the lever. As a consequence, this may result in a pressure difference of several bar in the two brake circuits.

SUMMARY OF THE INVENTION

It is, therefore, an object of the present invention to improve upon the dual-circuit pressure control valve of the type referred to hereinabove such that a pressure difference in the brake circuit is avoided without requiring a special surface treatment of those components which serve to support the lever at the housing and to ensure that equal pressure is present in the brake circuits even in the presence of dirt or oxidation.

A feature of the present invention is the provision of a dual-circuit pressure control valve for hydraulic brake systems comprising a housing; two control pistons disposed in the housing in a parallel side-by-side relationship, each of the two pistons being assigned to a different one of two brake circuits and loaded by a common, adjustable preloading force; and a lever having a longitudinal axis supported in a mount fastened to the housing acting on each of the control pistons to distribute the preloading force thereto, the lever being tiltable about an axis parallel to the two pistons and about the longitudinal axis, the lever bearing against the mount at a selected one of one support point and two support points, the selected one of the one support point and the two support points being disposed approximately in the longitudinal axis.

In accordance with the present invention, a control for the dual-circuit pressure control valves is provided which permits ease of manufacture and assembly, which is not affected by tolerance and adjustment problems and due to this control a pressure difference in the two brake circuits is positively prevented.

The invention permits a plurality of construction versions. For an arrangement with two points of support, it is particularly advantageous that the mounting includes a bolt with a hemispherical head and the lever includes a tapering indentation with an opening and that the bolt penetrates the opening and the spherical surface is placed in the indentation. According to a preferred embodiment of a support with two points of support, the radius of the indentation in the plane of the points of support is greater than the head's radius, and the lever is provided with a rounded-off projection extending inwardly and forming a point of support. By this structure the points of support are always located in the longitudinal axis of the lever, even in case of the bolt being twisted.

Another embodiment of the present invention provides that the spherical surface of the head includes two grooves each displaced by 180° and being of calotte-shaped cross-section, and that the indentation of the lever has two elevations each displaced by 180°, the bend radius or radius of curvature of which is smaller than that of the grooves, and that the elevations are in interaction with the respective groove bottom. In a like arrangement, the indentation of the lever can be cone-shaped, and the elevations are formed by rivets with hemispherical heads.

A particularly simple embodiment of the device in accordance with the present invention is attained by having the indentation, at least in the plane of the points of support, shaped like an ellipse in a radial section, the ends of the ellipse's secondary axis forming the points of support.

A preferred embodiment of the device in accordance with the present invention having one single point of support includes the lever incorporating a bore through which a bolt extends which forms the mounting and whose head includes on the side close to the housing an annular groove with circle-segment-shaped cross-section which is engaged by a projection of the lever having a smaller bend radius. According to a different embodiment with one-point-support, the lever includes a spherical cup which is engaged by a ball-shaped end portion of a setscrew having an essentially smaller bend radius and against which the bottom of the cup is bearing.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
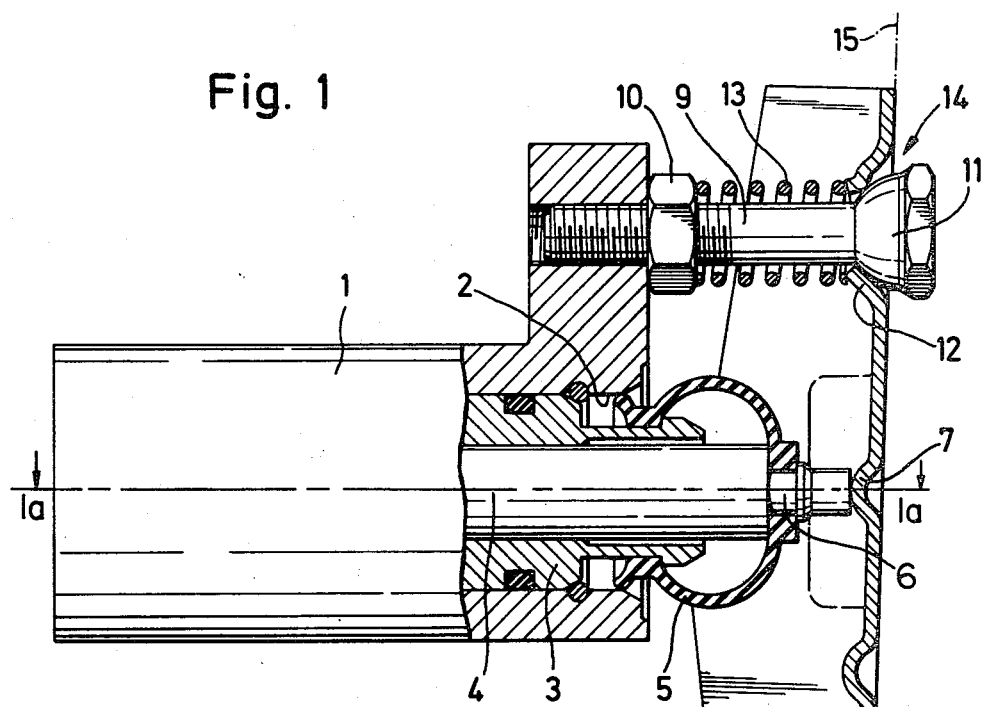
FIG. 1 is a partial longitudinal cross-sectional view of a dual-circuit pressure control valve with a control device in accordance with the principles of the present invention.
Figure 1A:
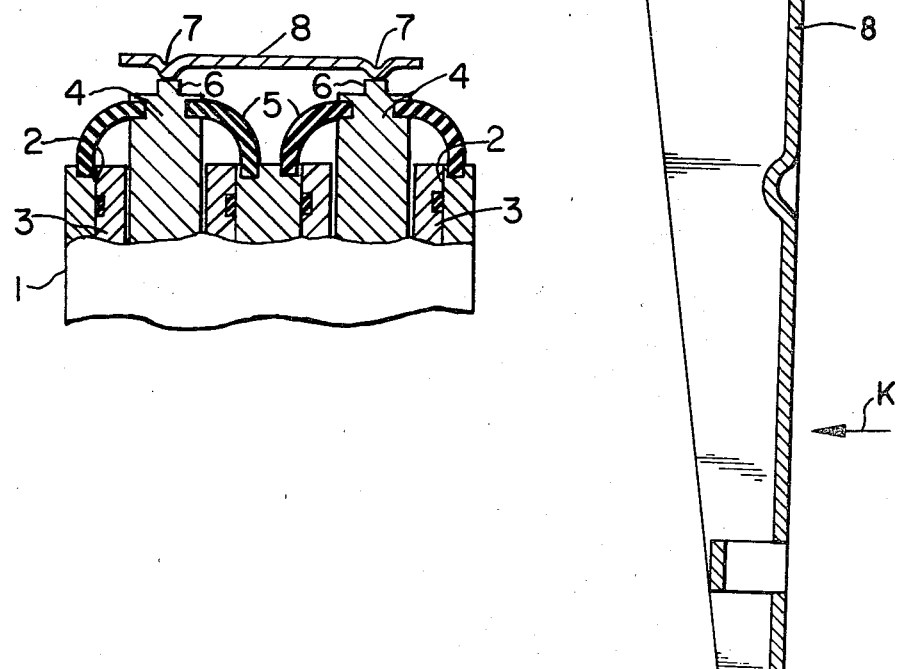
FIG. 1a is a schematic cross sectional view taken along line 1a—1a of FIG. 1.

FIGS. 1 and 1a are a schematical representation of the housing 1 of a dual-circuit pressure control valve comprising two bores 2 arranged side by side and parallel to each other. Each of bores 2 contains a bushing 3 in which the control piston 4 is guided. Each control piston 4 contains a non-illustrated valve which is open in the rest position of the control pistons. Arranged on the outside of and between the end portion of bushing 3 and the end portion of the control piston 4 is a sleeve 5 preventing the ingress of dirt.

Each of the two control pistons 4 has an actuating tappet 6 disposed outside its end portion. Abutting these actuating tappets 6 are indentations 7 of a lever 8, which lever is acted upon by a control force K in direction of the longitudinal axis of control pistons 4 at an end portion below indentations 7 and is movably fastened to a bolt 9 screwed into housing 1 at an end portion above indentation 7. Bolt 9 is secured against twisting by means of a lock nut 10 so that the distance to housing 1 once adjusted will not change. Bolt 9 has a head 11 with a spherical surface adjoining the bolt stem. Lever 8 has a tapering indentation 12 with an opening. Bolt 9 penetrates this opening, and head 11 is positioned in indentation 12. Extending between lock nut 10 and indentation 12 is a helical spring 13 which encircles bolt 9 and which keeps the upper end portion of lever 8 in abutment with the spherical surface of head 11. The mounting of lever 8 is designated in general by reference numeral 14 and the longitudinal axis of lever 8 by reference numeral 15.

Figure 2A:
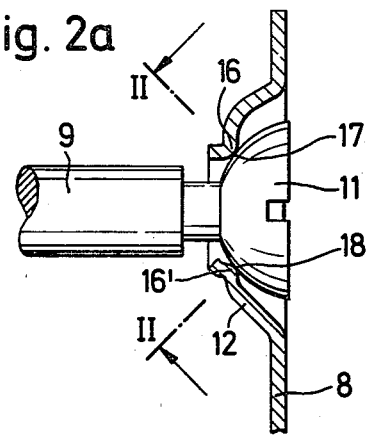
FIGS. 2a and 2b are enlarged cross-sectional views of a second embodiment of the two-point-support of the lever of FIG. 1.
Figure 2B:
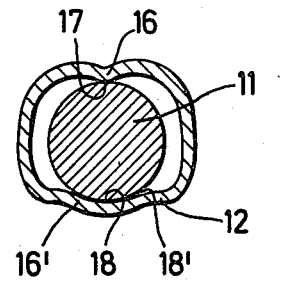

An enlarged illustration of the construction of mounting 14 is of FIG. 1 shown in FIGS. 2a and 2b. Bolt 9 includes a head 11 with a spherical surface with head 11 being placed in an indentation 12 of lever 8. The indentation 12 is essentially the shape of a truncated cone. However, indentation 12 includes a rounded-off projection 16 extending inwardly toward head 11 and arranged in longitudinal axis 15 of lever 8. A second projection 16' of indentation 12 is positioned on the other side of head 11, and projection 16' extends transversely to longitudinal axis 15 of lever 8. Housed in second projection 16' is an indentation 18'. The points of support 17 and 18 are the result of this formation of indentation 12. In FIG. 2b, an enlarged cross-section taken along the line II in FIG. 2a is illustrated.

Figure 3A:
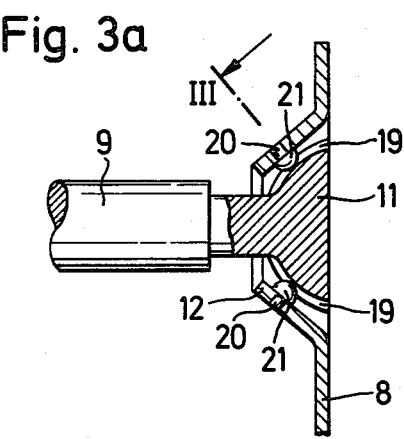
FIGS. 3a and 3b are enlarged cross-sectional views of a third embodiment of a two-point-support for the lever of FIG. 1.

A bolt 9 with a spherical head 11 is shown in FIG. 3a. Head 11 includes two grooves 19 each displaced by 180°. Arranged in indentation 12 of lever 8 are two rivets 20 each displaced by 180° and having hemispherical heads 21 which engage grooves 19.

Figure 3B:
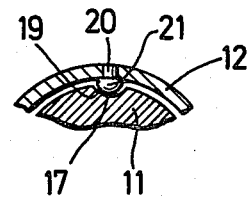

FIG. 3b shows an enlarged illustration of the cross-section taken along the line III in FIG. 3a. It may be seen from FIG. 3b that the bend radius of head 21 is smaller than the bend radius of the circle-segment-shaped cross-section of groove 19. Point of support 17 is formed in the bottom of groove 19.

Figure 4A:
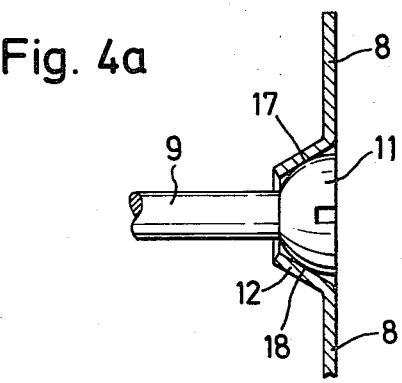
FIGS. 4a and 4b are an enlarged cross-sectional view and a top view, respectively, of a fourth embodiment of a two-point-support for the lever of FIG. 1.
Figure 4B:
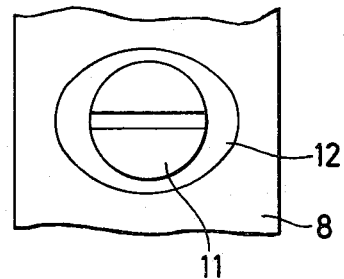

A bolt 9 having a head 11 with a spherical surface is shown in FIG. 4a. The indentation 12 of lever 8 is shaped like an ellipse. The cross-section illustrated shows the secondary axis of the ellipse. The ends of the secondary axis form the points of support 17 and 18. A top view of the arrangement according to FIG. 4a is shown in FIG. 4b. FIG. 4b clearly illustrates that indentation 12 has the shape of an ellipse, whose secondary axis is situated in the longitudinal axis of lever 12.

Figure 5:
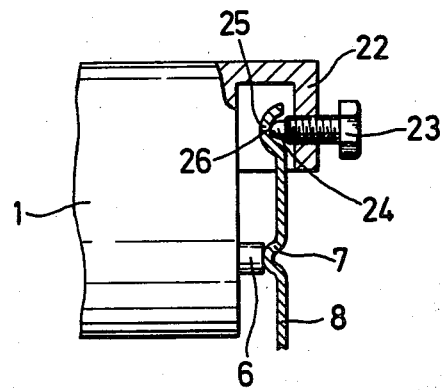
FIG. 5 is a partial cross-sectional view of a first embodiment of a one-point-support for the lever of FIG. 1.

In FIG. 5, reference numeral 1 designates a housing of a dual-circuit pressure control valve having protruding therefrom the actuating tappets 6 of the pistons. Lever 8 abuts with its indentations 7 actuating tappets 6. Housing 1 includes a projection 22, which is in sectional view shaped like a capital letter L, with the leg of projection 22 extending parallel to the side of housing 1 from which actuating tappets 6 protrude being provided with a taphole into which a screw 23 is threaded. Screw 23 is of spherical construction at its end portion 24 close to housing 1. The upper end of lever 8 has a spherical cup 25, whose bend radius is essentially greater than the bend radius of end portion 24 of screw 23. The point of contact of components 24 and 25 forms the point of support 26 of this one-point-support.

Figure 6:
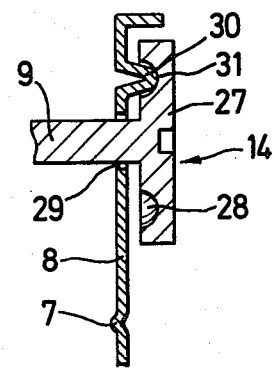
FIG. 6 is a cross-sectional view of a second embodiment of a one-point-support for the lever of FIG. 1.

FIG. 6 shows a bolt 9 which can be screwed in a housing having the head 27 constructed like a disc. Disposed on the side of head 27 close to the housing is an annular groove 28 which is of semi-circular cross-section. The upper end of lever 8 includes a bore 29 through which bolt 9 extends. Moreover, lever 8 has a projection 30 directed toward head 27 engaging groove 28, projection 30 being further away from indentations 7 than bore 29. Projection 30 is of smaller bend radius than the cross-section of annular groove 28 and forms the point of support 31 of the one-point-support by abutting the bottom of groove 28.

While we have described above the principles of our invention in connection with specific apparatus, it is to be clearly understood that this description is made only by way of example and not as a limitation to the scope of our invention as set forth in the objects thereof and in the accompanying claims.

We claim:

1. A dual-circuit pressure control valve for hydraulic brake systems comprising:
   a housing;
   two control pistons disposed in said housing in a parallel side-by-side relationship, each of said two pistons being assigned to a different one of two brake circuits and loaded by a single common, adjustable preloading force; and
   a lever having a longitudinal axis supported in a mount fastened to said housing acting on each of said control pistons to distribute said preloading force evenly thereto, said lever being tiltable about an axis parallel to said two pistons and about said longitudinal axis, said lever bearing against said mount at at least one support point disposed approximately in said longitudinal axis.

2. A control valve according to claim 1, wherein said mount includes a bolt having a shank and a head with hemispherical surface, and
   said lever includes a tapered indentation with an opening disposed at the bottom of said tapered indentation, said opening receiving said shank and said tapered indentation receiving said hemispherical surface.

3. A control valve according to claim 2, wherein said tapered indentation has a radius greater than a radius of said hemispherical surface and a rounded-off projection extending inwardly to provide one of two support points.

4. A control valve according to claim 3, wherein the other of said two support points is provided by a second indentation disposed in a second projection in said tapered indentation extending inwardly, said second indentation being disposed perpendicular to said longitudinal axis.

5. A control valve according to claim 2, wherein said hemispherical surface includes two grooves each displaced 180° with respect to each other and having a circle-segment-shaped cross-section, and said tapered indentation includes two elevations each displaced 180° with respect to each other, each of said two elevations having a radius smaller than that of said two grooves, each of said two elevations engaging a bottom of a different one of said two grooves to provide two support points.

6. A control valve according to claim 5, wherein said tapered indentation is cone-shaped, and each of said two elevations include a rivet having a hemispherical head.

7. A control valve according to claim 2, wherein said tapered indentation is shaped like an ellipse having a secondary axis whose ends provide two support points.

8. A control valve according to claim 1, wherein said lever includes a bore and a projection having a given radius of curvature, and said mount includes a bolt having a head and a shank, said shank extending through said bore to said housing and said head has an annular groove in a surface thereof adjacent said housing having a radius of curvature greater than said given radius of curvature to engage said projection to provide said one support point.

9. A control valve according to claim 1, wherein said lever includes a spherical cup formed therein having a given radius of curvature, and said mount includes a setscrew fastened to said housing having an end engaging a bottom of said cup, said end having a radius of curvature less than said given radius of curvature to provide said one support point.

* * * * *